United States Patent
Covaci et al.

(10) Patent No.: US 12,355,889 B2
(45) Date of Patent: *Jul. 8, 2025

(54) COMPUTER-IMPLEMENTED SYSTEMS AND METHODS FOR COMBINING BLOCKCHAIN TECHNOLOGY WITH DIGITAL TWINS

(71) Applicant: nChain Licensing AG, Zug (CH)

(72) Inventors: Alexandra Covaci, Canterbury (GB); Giuseppe Destefanis, London (GB); Simone Madeo, London (GB); Patrick Motylinski, London (GB); Stephane Vincent, Luxembourg (LU)

(73) Assignee: NCHAIN LICENSING AG, Zug (CH)

( * ) Notice: Subject to any disclaimer, the term of this patent is extended or adjusted under 35 U.S.C. 154(b) by 0 days.

This patent is subject to a terminal disclaimer.

(21) Appl. No.: 18/658,487

(22) Filed: May 8, 2024

(65) Prior Publication Data
US 2024/0372724 A1 Nov. 7, 2024

Related U.S. Application Data

(63) Continuation of application No. 18/213,242, filed on Jun. 22, 2023, now Pat. No. 12,010,233, which is a
(Continued)

(30) Foreign Application Priority Data

| | | |
|---|---|---|
| Nov. 2, 2017 | (GB) | 1718182 |
| Nov. 20, 2017 | (GB) | 1719212 |
| Mar. 23, 2018 | (GB) | 1804744 |

(51) Int. Cl.
*H04L 29/06* (2006.01)
*G06F 16/27* (2019.01)
(Continued)

(52) U.S. Cl.
CPC .......... *H04L 9/3215* (2013.01); *G06F 16/27* (2019.01); *G06F 21/64* (2013.01); *H04L 9/0637* (2013.01);
(Continued)

(58) Field of Classification Search
None
See application file for complete search history.

(56) References Cited

U.S. PATENT DOCUMENTS

| | | |
|---|---|---|
| 4,918,589 A | 4/1990 | Floro et al. |
| 5,034,686 A | 7/1991 | Aspelin |

(Continued)

FOREIGN PATENT DOCUMENTS

| | | |
|---|---|---|
| CN | 105812126 A | 7/2016 |
| CN | 106022681 A | 10/2016 |

(Continued)

OTHER PUBLICATIONS

Angrish et al., "A Flexible Data Schema and System Architecture for the Virtualization of Manufacturing Machines (VMM)," 2017, 3 pages.

(Continued)

*Primary Examiner* — Andrew J Steinle
(74) *Attorney, Agent, or Firm* — Tarolli, Sundheim, Covell & Tummino LLP

(57) ABSTRACT

A computer implemented method and system is described which uses blockchain technology as a storage system for data acquired from a digital twin. The blockchain can be used to generate an immutable transaction history of data produced by the digital twin. In the case of an error, failure, incident, or accident, parties of interest can then access and analyse an immutable set of data. The blockchain network can also execute a digital smart contract based on the data received from a digital twin. The invention may be used in (Continued)

Fig. 4 conjunction with the Bitcoin blockchain or another blockchain protocol.

18 Claims, 5 Drawing Sheets

Related U.S. Application Data continuation of application No. 16/761,195, filed as application No. PCT/IB2018/058256 on Oct. 23, 2018, now Pat. No. 11,722,302.

(51) Int. Cl.

| | |
|---|---|
| *G06F 21/64* | (2013.01) |
| *H04L 9/06* | (2006.01) |
| *H04L 9/08* | (2006.01) |
| *H04L 9/32* | (2006.01) |
| *G06Q 20/38* | (2012.01) |
| *H04L 9/00* | (2022.01) |

(52) U.S. Cl.
CPC .......... *H04L 9/0891* (2013.01); *H04L 9/3236* (2013.01); *H04L 9/3239* (2013.01); *H04L 9/3297* (2013.01); *G06Q 20/389* (2013.01); *H04L 9/50* (2022.05)

(56) References Cited

U.S. PATENT DOCUMENTS

| | | | |
|---|---|---|---|
| 5,801,938 A | 9/1998 | Kalantery | |
| 9,426,185 B1 | 8/2016 | Vora et al. | |
| 11,050,690 B2 | 6/2021 | Hong et al. | |
| 11,080,665 B1 | 8/2021 | Poelstra et al. | |
| 11,514,448 B1* | 11/2022 | Liberman | G06Q 20/3829 |
| 2010/0070674 A1 | 3/2010 | Campbell | |
| 2011/0157473 A1 | 6/2011 | Choi et al. | |
| 2013/0069772 A1 | 3/2013 | Najafi et al. | |
| 2015/0213122 A1 | 7/2015 | Neumeier et al. | |
| 2016/0098723 A1 | 4/2016 | Feeney | |
| 2016/0134593 A1 | 5/2016 | Gvili | |
| 2016/0164884 A1 | 6/2016 | Sriram et al. | |
| 2016/0261404 A1 | 9/2016 | Ford et al. | |
| 2016/0321654 A1 | 11/2016 | Lesavich et al. | |
| 2016/0357686 A1 | 12/2016 | Waldspurger et al. | |
| 2017/0147975 A1 | 5/2017 | Natarajan et al. | |
| 2017/0163733 A1 | 6/2017 | Grefen et al. | |
| 2017/0173262 A1 | 6/2017 | Veltz | |
| 2017/0235970 A1 | 8/2017 | Conner | |
| 2017/0262862 A1 | 9/2017 | Aljawhari | |
| 2017/0284974 A1 | 10/2017 | Hershey et al. | |
| 2017/0287090 A1 | 10/2017 | Hunn et al. | |
| 2017/0307387 A1 | 10/2017 | Kohlhepp | |
| 2017/0310747 A1 | 10/2017 | Cohn et al. | |
| 2017/0364908 A1 | 12/2017 | Smith et al. | |
| 2017/0366347 A1 | 12/2017 | Smith | |
| 2018/0001183 A1 | 1/2018 | Tran et al. | |
| 2018/0007131 A1 | 1/2018 | Cohn et al. | |
| 2018/0017447 A1 | 1/2018 | Raj et al. | |
| 2018/0063709 A1 | 3/2018 | Morrison | |
| 2018/0082043 A1 | 3/2018 | Witchey et al. | |
| 2018/0094953 A1 | 4/2018 | Colson et al. | |
| 2018/0115428 A1 | 4/2018 | Lysenko et al. | |
| 2018/0117446 A1 | 5/2018 | Tran et al. | |
| 2018/0139056 A1 | 5/2018 | Imai et al. | |
| 2018/0139278 A1* | 5/2018 | Bathen | H04L 9/3247 |
| 2018/0144147 A1 | 5/2018 | Nix | |
| 2018/0173372 A1 | 6/2018 | Greenspan et al. | |
| 2018/0227277 A1 | 8/2018 | Fischer et al. | |
| 2018/0264347 A1 | 9/2018 | Tran et al. | |
| 2019/0114182 A1 | 4/2019 | Chalakudi et al. | |
| 2019/0171187 A1 | 6/2019 | Cella et al. | |
| 2019/0266146 A1 | 8/2019 | Rose et al. | |
| 2020/0225655 A1 | 7/2020 | Cella et al. | |
| 2020/0348662 A1 | 11/2020 | Cella et al. | |
| 2021/0081938 A1* | 3/2021 | Falk | H04L 9/3247 |
| 2021/0157312 A1 | 5/2021 | Cella et al. | |
| 2023/0186201 A1 | 6/2023 | Cella et al. | |

FOREIGN PATENT DOCUMENTS

| | | |
|---|---|---|
| CN | 107122985 A | 9/2017 |
| CN | 107194822 A | 9/2017 |
| CN | 107301501 A | 10/2017 |
| EP | 3382616 A1 | 10/2018 |
| GB | 2551643 A | 12/2017 |
| JP | H11177623 A | 7/1999 |
| JP | 2006279179 A | 10/2006 |
| JP | 2009081564 A | 4/2009 |
| KR | 20160127878 A | 11/2016 |
| WO | 2017165909 A1 | 10/2017 |
| WO | 2017187397 A1 | 11/2017 |
| WO | 2017198891 A1 | 11/2017 |
| WO | 2017201489 A1 | 11/2017 |
| WO | 2017220115 A1 | 12/2017 |
| WO | 2018026727 A1 | 2/2018 |
| WO | 2018037148 A1 | 3/2018 |

OTHER PUBLICATIONS

Anonymous, "What is Blockchain Technology? A Step-by-Step Guide for Beginners," retrieved from https://web.archive.org/web/20171016062654/https://blockgeeks.com/guides/what-is-blockchain-technology/, Oct. 16, 2017, 12 pages.
Antonopoulos, "Mastering Bitcoin—Unlocking Digital Cryptocurrencies," O'Reilly Media, Inc., Dec. 20, 2014, 282 pages.
Blechschmidt, "Digital Twin on Blockchain," Cognizant Business Consulting, Jun. 2017, 15 pages.
Blockgeeks, "What is Blockchain Technology? A Step-by-Step Guide for Beginners," retrieved from https://web.archive.org/web/20171016062654/https://blockgeeks.com/guides/what-is-blockchain-technology/, Oct. 16, 2017, 2 pages.
Chattopadhyay, Arnab, "IoT Security Using Blockchain", Labs Blog (http://sogeti.com/category/labs-blog, May 31, 2017, 8 pages.
Citibank, Inc., "The Impact of the Blockchain", Editorial Committee, Japan, 2016, 3 pages.
Cpchain, "Decentralized Infrastructure for Next Generation Internet of Things," Jan. 10, 2018, 34 pages.
Datta, "Emergence of Digital Twins—Is This the March of Reason?," Journal of Innovation Management, 2017, 20 pages.
Gutierrez, "Boeing Improves Operations with Blockchain and the Internet of Things," retrieved from https://www.altoros.com/blog/boeing-improves-operations-with-blockchain-and-the-internet-of-things/, May 24, 2017, 12 pages.
Heber et al., "Towards a Digital Twin: How the Blockchain Can Foster E/E-traceability in Consideration of Model-Based Systems Engineering," International Conference on Engineering Design, Aug. 21-25, 2017, 10 pages.
Heber et al., "Towardsw a Digital Twin: How the Blockchain Can Foster E/E-traceability in Consideration of Model-Based Systems Engineering," International Conference on Engineering Design, Aug. 21-25, 2017, 10 pages.
Higashikado et al., "A Study on Certificate Management in Consortium Chain", A Study on certificate management in consortium chain, proceedings of 2017 Symposium on Cryptography and Information Security, Japan, Jan. 24, 2014, 8 pages.
International Search Report and Written Opinion for Application No. PCT/IB2018/058256, mailed Jan. 31, 2019, filed Oct. 23, 2018, 15 pages.
International Search Report and Written Opinion mailed Feb. 1, 2019, Patent Application No. PCT/IB2018/058258, 14 pages.
International Search Report and Written Opinion mailed Mar. 29, 2019, Patent Application No. PCT/IB2018/058258, 20 pages.
IPLD, "IPLD" retrieved from https://web.archive.org/web/20170921113308/http://ipld.io/, Sep. 21, 2017, 10 pages.

(56) References Cited

OTHER PUBLICATIONS

Jaffey, "MQTT and CoAP, IoT Protocols," Eclipse News Letter, retrieved from https://web.archive.org/web/20170731183138/http://www.eclipse.org/community/eclipse_newsletter/2014/february/article2.php, Jul. 31, 2017, 5 pages.

Jim, "Journal of Innovation Management—The International Journal on Multidisciplinary Approaches on Innovation," retrieved from https://repositorio-aberto.up.pt/handle/10216/107952, Oct. 30, 2017, 161 pages.

Keane, "Trust Your Odometer? Blockchain Test Aims to Turn Tide on Car Tampering," retrieved from https://www.coindesk.com/markets/2017/07/21/trust-your-odometer-blockchain-test-aims-to-turn-tide-on-car-tampering/, Jul. 21, 2017, 6 pages.

LG, "MQTT, Node-RED & Blockchain," baumann.at, Oct. 17, 2017, 3 pages.

Lin et al., "Blockchain: The Evolutionary Next Step for ICT E-Agriculture," Environments, 2017, 13 pages.

Ly at al., "If An IoT Device's is Unable to Store its Data to the Ledger Due to the Size Limitation, What Will Happen?," Quora, https://www.quora.com/If-an-IoT-device%E2%80%99s-is-unable-to-store-its-data-to-the-ledger-due-to-the-size-limitation-what-will-happen, 2017, 6 pages.

Makers, "#1 Meetup: IOTA and its Practical Application in the Automotive Industry," https://www.youtube.com/watch?v=SVTOHdrsJ-U, Sep. 25, 2017, 24 pages.

Nakamoto, "Bitcoin: A Peer-to-Peer Electronic Cash System," Bitcoin, Oct. 31, 2008, https://bitcoin.org/bitcoin.pdf, 9 pages.

Ouaddah et al., "FairAccess: a new Blockchain based access control framework for the Internet of Things," Security and Communication Networks 9(18):5943-5964, Feb. 2017, https://www.researchgate.net/publication/313847688_FairAccess.

Satoshi et al., "Connection Limits," Bitcoin Forum, Aug. 9, 2010, https://bitcointalk.org/index.php?topic=741.0;prev_next=prev, 2 pages.

Shafagh et al., "Towards Blockchain-based Auditable Storage and Sharing of IoT Data," May 22, 2017, 2 pages.

Shafagh et al., "Towards Blockchain-based Auditable Storage and Sharing of IoT Data," Nov. 14, 2017, 6 pages.

Sharma et al., "A Software Defined Fog Node Based Distributed Blockchain Cloud Architecture for IoT," IEEE Access, Sep. 29, 2017, 10 pages.

Sheridan, "Digitizing Vehicles: The First Blockchain-Backed Car Passport," BigchainDB Blog, https://blog.bigchaindb.com/digitizing-vehicles-the-first-blockchain-backed-car-passport-b55ead6dbc71, Mar. 24, 2017, 5 pages.

Sogeti Labs, "IoT Security Using Blockchain," retrieved from https://labs.sogeti.com/iot-security-using-blockchain/, May 31, 2017, 13 pages.

Stöcker, "Implementing First Industry 4.0 Use Cases with SAG Tangle Machine Tagging for Digital Twins," retrieved from https://cstoecker.medium.com/implementing-first-industry-4-0-use-cases-with-iota-dag-tangle-machine-tagging-for-digital-twins-baf1943c499d, Jun. 24, 2017, 9 pages.

Trouton et al., "3D Opportunity for Blockchain," Deloitte University Press, 2016, 20 pages.

UK Commercial Search Report mailed Feb. 15, 2018, Patent Application No. GB1718182.7, 12 pages.

UK Commercial Search Report mailed Feb. 16, 2018, Patent Application No. GB1719212.1, 15 pages.

UK IPO Search Report mailed May 1, 2018, Patent Application No. GB1718182.7, 5 pages.

UK IPO Search Report mailed May 1, 2018, Patent Application No. GB1719212.1, 5 pages.

UK IPO Search Report mailed May 1, 2018, Patent Application No. GB1804744.9, 5 pages.

Van Der Ploeg, "Releasing the Potential of Blockchain—Why Unchain.io?," Sep. 7, 2017, 2 pages.

Zyskind et al., "Decentralizing Privacy: Using a Blockchain to Protect Personal Data," 2015 IEEE CS Security and Privacy Workshops, May 21, 2015, 5 pages.

Sako et al., "Kazue, Transparency and Fairness" The Blockchain Technology to Realize, an Information Processing, Japan, General Incorporated Foundation Information Processing Society of Japan, Aug. 15, 2016, 57th Volume No. 9, 10 pages.

\* cited by examiner

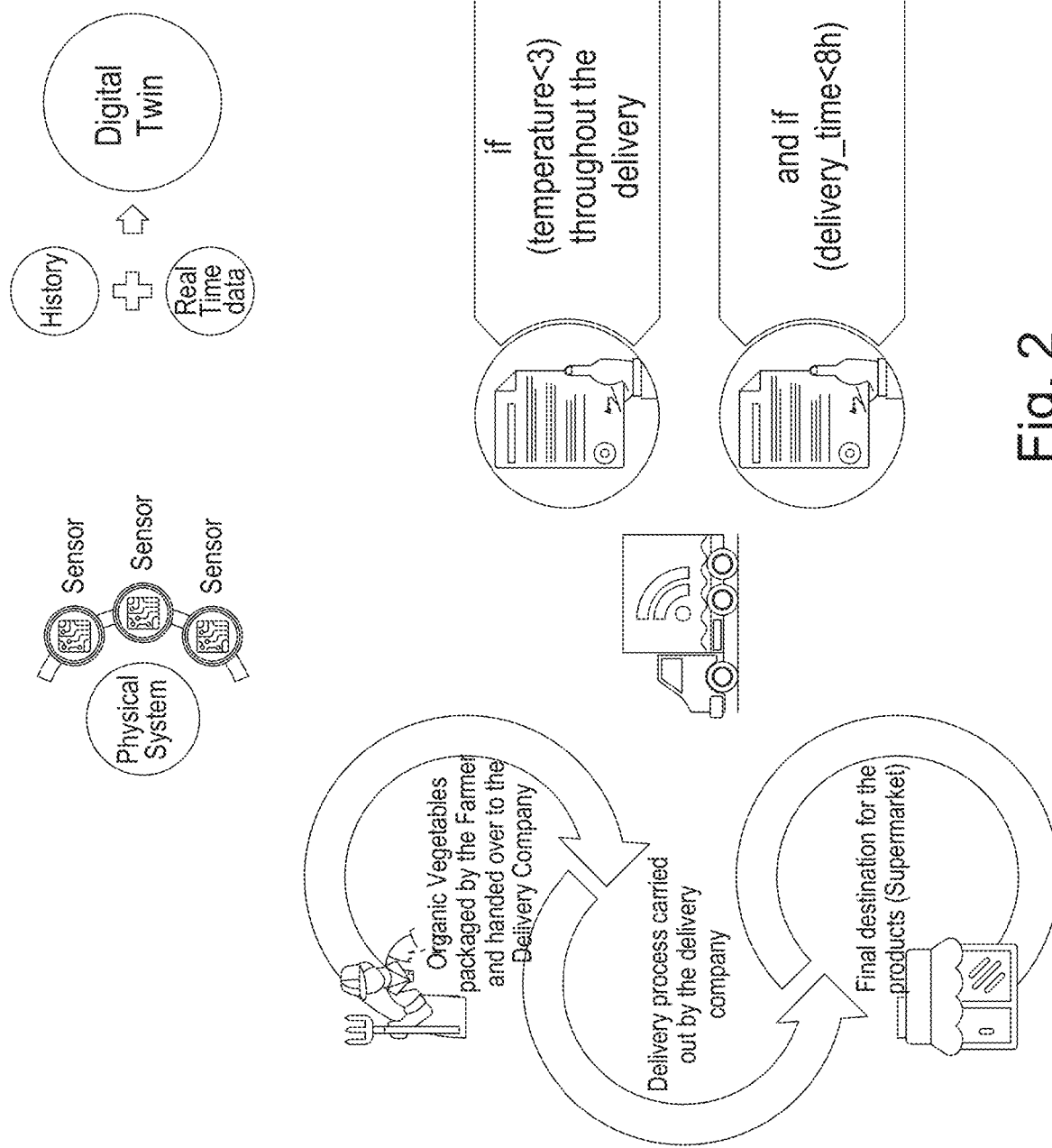

COMPUTER-IMPLEMENTED SYSTEMS AND METHODS FOR COMBINING BLOCKCHAIN TECHNOLOGY WITH DIGITAL TWINS

CROSS REFERENCE TO RELATED APPLICATIONS

This application is a continuation of U.S. patent application Ser. No. 18/213,242, filed Jun. 22, 2023, entitled "COMPUTER-IMPLEMENTED SYSTEMS AND METHODS FOR COMBINING BLOCKCHAIN TECHNOLOGY WITH DIGITAL TWINS," which is a continuation of U.S. patent application Ser. No. 16/761,195, filed May 1, 2020, now U.S. Pat. No. 11,722,302, entitled "COMPUTER-IMPLEMENTED SYSTEMS AND METHODS FOR COMBINING BLOCKCHAIN TECHNOLOGY WITH DIGITAL TWINS," which is a 371 National Stage of International Patent Application No. PCT/IB2018/058256, filed Oct. 23, 2018, which claims priority to United Kingdom Patent Application No. 1718182.7, filed Nov. 2, 2017, United Kingdom Patent Application No. 1719212.1, filed Nov. 20, 2017, and United Kingdom Patent Application No. 1804744.9, filed Mar. 23, 2018, the disclosures of which are incorporated herein by reference in their entirety.

FIELD OF INVENTION

This specification relates generally to computer-implemented methods and systems suitable for implementation in nodes of a blockchain network. The invention is particularly suited, but not limited, to use with the Bitcoin blockchain.

BACKGROUND OF INVENTION

Today industrial assets are designed relying on various models and a high number of data sources. Data scientists work with enormous amounts of data while specialized teams create models separately and conduct analysis for their specific tasks. The most current information and calculations may not be readily available for crucial decisions and this way of working in silos drives cost and inefficiencies, creates uncertainties, and a vast amount of time and resources get wasted. In order to get the most out of data generated by sensors and processes, digital twins are very useful.

A digital twin is a virtual dynamic copy of a real object, process, or service through which it is possible to conduct tests and prevent errors or failures. It is possible to create a digital twin of a product, a mechanical part of an aircraft or car, a production process, and so on. Digital twins can be seen as a revolutionary combination of simulations and real time data and responses.

The act of simulating a process or a system presumes knowledge of how all the variables involved in the simulation behaved in the past and a sufficiently large timeframe during which the system under test has been observed during which all the input/output variables have been recorded. Having knowledge of the past is a prerequisite for building a good simulator. The possibility of adding real time information to this process can dramatically increase the precision and the accuracy of the whole simulation until the point of mirroring the exact behaviour of a system or process. This possibility is revolutionary for the industrial world (Industry 4.0), and Gartner classified digital twins as one of the most important disruptive technologies in 2017 [http://www.gartner.com/smarterwithgartner/gartners-top-10-technology-trends-2017/].

FIG. 1 shows a simple schematic illustration of a digital twin for a physical system. Sensors gather data about a physical system which could be, for example, a part of an aircraft. Historical data is used to construct the digital twin which then evolves to simulate the physical system as further real time data is fed into the system. The digital twin can be used to monitor parameters of the physical system, assess the current status of the physical system, predict the future status of the physical system, and conduct tests in order to, for example, predict failures of the physical system and thus aid in avoiding failures, e.g., by replacing a part or by operating the physical system in a different manner.

SUMMARY OF INVENTION

A number of problems have been identified with current digit twin technology as discussed below.

The reliability and security of a digital twin is dependent upon the security of the data on which the digital twin is reliant. The data should ideally be immutable such that the operation of the digital twin cannot be tampered with during real time operation and correctly reflects the status of the physical system. This can be important, for example, to prevent a third party from interfering with the data such that the digital twin does not properly represent the real time status of the physical system and provides misleading information which could lead to an operation error or failure in the physical system.

Furthermore, the stored data should be immutable such that an accurate and reliable historical record of the performance of the system is retained. This may be important, for example, if the physical system fails and the data needs to be checked to confirm why the physical system failed and if any liability exists on the part of the user or manufacture of the physical system. It may also be important in a process where a certain action may be reliant on the performance of an earlier action. In this case, a third party could potentially alter the stored data to make it look like a certain action has been performed, when it has not, thereby erroneously triggering a further action.

A further problem is that of accessibility of the data to each of a number of interested parties. The parties may well have conflicting interests and so it would be advantageous to have a neutral record of the data which is secure and immutable yet accessible by all parties.

Yet a further problem is that conventional data storage solutions, such as a black box recorder in an aircraft, may be damaged or lost in the event of an accident.

Yet another problem is that in a scenario where a further action is required once a previous action has been completed, a digital twin can indicate that the further action is required but cannot ensure that it is actually performed. For example, a digital twin may indicate that a certain physical process has been completed, thus requiring a further step such as payment for completion of the physical process. However, the digital twin cannot ensure that such a payment is actually made and thus is reliant on a party to the process to be trustworthy and pay, or otherwise pay in advance which is then depend on the trustworthiness of the provider of the process to properly complete the process.

It is an aim of certain embodiments of the present invention to address these problems by providing solutions as set out herein.

The present inventors have realized that the aforementioned problems can be addressed by using blockchain technology as a storage system for data acquired from physical systems and processes including real time applications using digital twins. For example, a blockchain can be used to generate an immutable transaction history of data produced by a digital twin. In the case of an error, failure, incident, or accident, parties of interest can then access and analyse an immutable set of data. This can be particularly important in safety-critical systems such as aircraft. Furthermore, as a blockchain provides a distributed storage of data then it is not susceptible to damage or loss of an individual storage unit.

Current blockchain technology is capable of fulfilling the aforementioned functionality when relatively small amounts of data are required to be stored at relative infrequent time periods. However, block size limits, and the fact that blocks are only incorporated into the blockchain approximately every 10 minutes, means that standard blockchain technology is not well suited as a storage system for real time applications where the amount of data generated is very large and/or where there is a requirement to store the data at a high frequency/fidelity, e.g., every second or millisecond. Approaches to overcoming these issues in order to utilize the blockchain as a storage system for such real time systems are also described herein.

Further still, the present inventors have realized that a digital twin can be made a party to a digital smart contract implemented on a blockchain network. This can ensure that steps can be executed by the blockchain network according to data received by the digital twin indicative of the state of a real physical system. That is, the blockchain network can be used to execute a digital smart contract with multiple parties related to a system or process incorporating the digital twin.

In light of the above, a computer-implemented method for a blockchain network is provided, the computer-implemented method comprising:
  receiving data at a node of the blockchain network, wherein said data is generated by a digital twin or derived from data generated by a digital twin; and
  storing said data in the blockchain.

The data stored in the blockchain may be associated with a given amount of data generated by the digital twin in a given frame of time. For example, data generated by the digital twin can be recorded in a node of the blockchain network and at a time t the node can generate a first hash of the data and record the hash both locally and in the blockchain. At intervals of time new hashes can be generated so as to generate a chain of hash that is recorded in the blockchain. The chain of hash in the blockchain can be utilized to verify the authenticity of the data recorded in the node.

Alternatively, the data stored in the blockchain can comprise the data generated by the digital twin thereby providing a historical record, e.g. a full historical record, in the blockchain of data generated by the digital twin. In this regard, the computer-implemented method may comprise the following steps:
  receiving transactions comprising data generated by the digital twin;
  validating said transactions at a transaction validation node in the blockchain network;
  maintaining a distributed, decentralized storage of validated transactions with other transaction validation nodes in the blockchain network; and
  distributing data corresponding to said validated transactions to the blockchain network for mining.

This method of handling transactions can enable a large amount of data from a digital twin to be processed using the blockchain network.

The method may further comprising:
  receiving mined data from the blockchain network corresponding to said validated transactions;
  assembling blocks based on said mined data; and
  sending assembled blocks to a storage entity for storing on a blockchain.

This method of constructing and storing blocks enables large blocks of data to be assembled and stored on the blockchain.

The data generated from the digital twin can be data associated with one or more parameters of a physical system generated by one or more sensors monitoring the one or more parameters of the physical system. Furthermore, the blockchain network can be configured to execute a digital smart contract based on the data received form the digital twin.

Embodiments of the present invention can be provided in a variety of forms. For example, a computer readable storage medium can be provided which comprises computer-executable instructions which, when executed, configure one or more processors to perform the method as described herein. An electronic device can also be provided which comprises: an interface device; one or more processor(s) coupled to the interface device; and a memory coupled to the one or more processor(s), the memory having stored thereon computer executable instructions which, when executed, configure the one or more processor(s) to perform the method as described herein. Further still, a node of a blockchain network can be provided, the node configured to perform the method as described herein.

In addition to the above, a digital twin can be provided which is configured to:
  receive data representing the state of a system; and
  send said received data, or data derived from said received data, from the digital twin to a blockchain network.

A system can also be provided comprising a digital twin and a blockchain network node as described herein.

BRIEF DESCRIPTION OF THE DRAWINGS

These and other aspects of the present invention will be apparent from and elucidated with reference to, the embodiments described herein. Embodiments of the present invention will now be described, by way of example only, and with reference to the accompany drawings, in which:

FIG. 1 shows a simple schematic illustration of a digital twin for a physical system;

FIG. 2 shows a simple example of a commercial chain with processes being automated among parties using the blockchain and smart contracts setting conditions for the processes;

DETAILED DESCRIPTION

Figure 3:
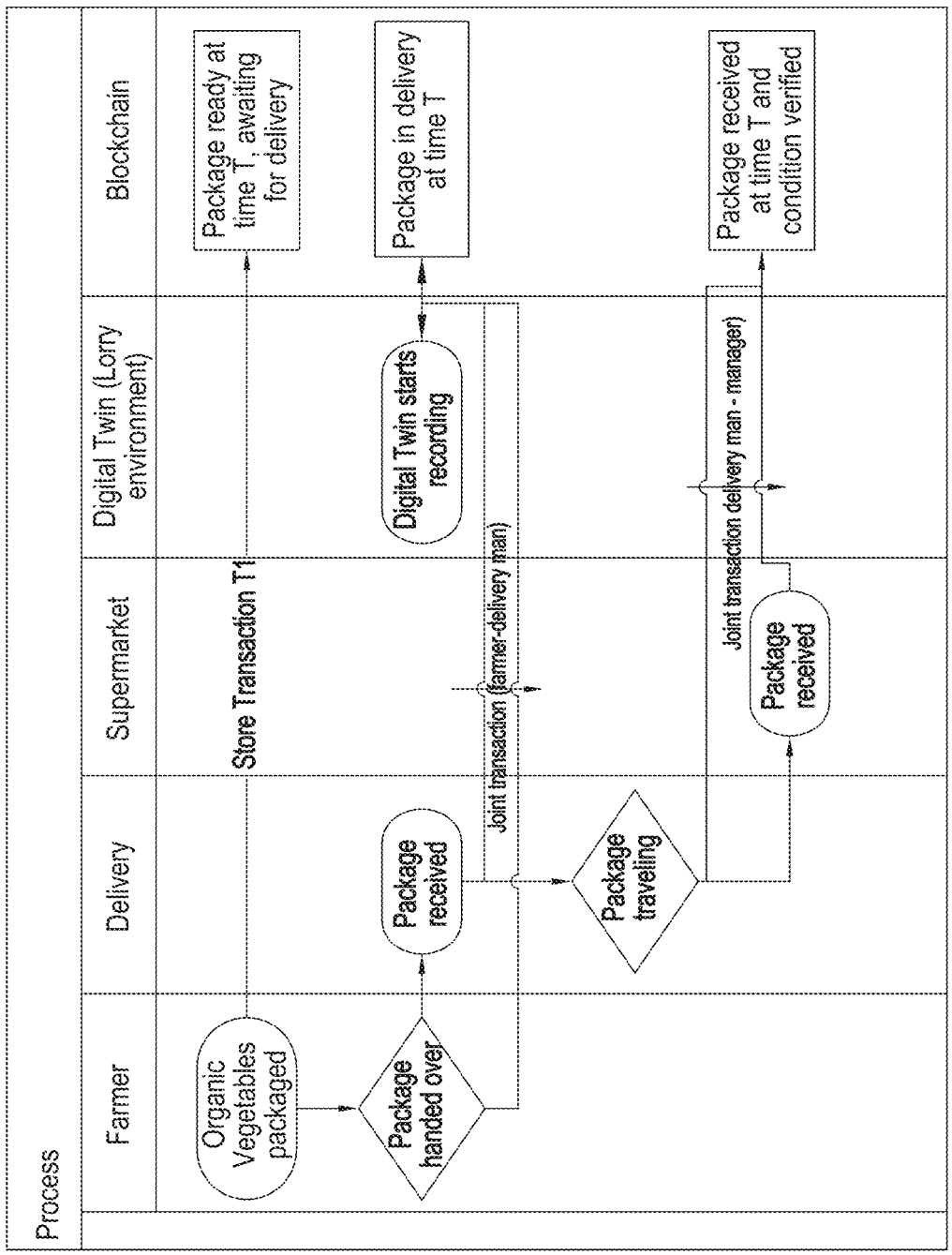
FIG. 3 shows a process diagram incorporating a digital twin into the system of FIG. 2.

In this document we use the term 'blockchain' to include all forms of electronic, computer-based, distributed ledgers.

These include, but are not limited to consensus-based blockchain and transaction-chain technologies, permissioned and un-permissioned ledgers, shared ledgers and variations thereof. The most widely known application of blockchain technology is the Bitcoin ledger, although other blockchain implementations have been proposed and developed. While Bitcoin may be referred to herein for the purpose of convenience and illustration, it should be noted that the invention is not limited to use with the Bitcoin blockchain and alternative blockchain implementations and protocols fall within the scope of the present invention.

A blockchain is a consensus-based, electronic ledger which is implemented as a computer-based decentralised, distributed system made up of blocks which in turn are made up of transactions and other information. In the case of Bitcoin, each transaction is a data structure that encodes the transfer of control of a digital asset between participants in the blockchain system, and includes at least one input and at least one output. Each block contains a hash of the previous block to that blocks become chained together to create a permanent, unalterable record of all transactions which have been written to the blockchain since its inception. Transactions contain small programs known as scripts embedded into their inputs and outputs, which specify how and by whom the outputs of the transactions can be accessed. On the Bitcoin platform, these scripts are written using a stack-based scripting language.

In order for a transaction to be written to the blockchain, it must be "validated." Some network nodes act as miners and perform work to ensure that each transaction is valid, with invalid transactions rejected from the network. For example, software clients installed on the nodes perform this validation work on transactions that reference unspent transaction outputs (UTXO). Validation may be performed by executing its locking and unlocking scripts. If execution of the locking and unlocking scripts evaluate to TRUE and, if certain other conditions are met, the transaction is valid and the transaction may be written to the blockchain. Thus, in order for a transaction to be written to the blockchain, it must be i) validated by a node that receives the transaction—if the transaction is validated, the node relays it to the other nodes in the network; and ii) added to a new block built by a miner; and iii) mined, i.e., added to the public ledger of past transactions. The transaction is considered to be confirmed when a sufficient number of blocks are added to the blockchain to make the transaction practically irreversible. At the time of writing, the Bitcoin blockchain network is based on a blocksize which contains approximately 2000 transactions and a block is mined approximately every 10 minutes.

Although blockchain technology is most widely known for the use of cryptocurrency implementation, digital entrepreneurs have begun exploring the use of both the cryptographic security system Bitcoin is based on and the data that can be stored on the blockchain to implement new systems. It would be highly advantageous if the blockchain could be used for automated tasks and processes which are not purely limited to payments denominated in cryptocurrency. Such solutions would be able to harness the benefits of the blockchain (e.g., a permanent, tamper proof record of events, distributed processing etc.) while being more versatile in their applications.

One area of research is the use of the blockchain for the implementation of "smart contracts." These are computer programs designed to automate the execution of the terms of a machine-readable contract or agreement. Unlike a traditional contract which would be written in natural language, a smart contract is a machine executable program which comprises rules that can process inputs in order to produce results, which can then cause actions to be performed dependent upon those results.

The present specification describes the use of the blockchain in combination with a digital twin and optionally also in combination with the use of smart contracts. As previously described, a digital twin can simplify supply management processes and can be an important diagnosis tool for safety critical systems (e.g. aircraft and aerospace industry or transportation in general). The potential applications for a combination of digital twin and blockchain technology are numerous. For example, a blockchain network can be used for safely storing information generated by a digital twin or for executing a contract with multiple parties involved related to a system or process incorporating a digital twin. A digital twin can effectively function as an interface between a physical system and the blockchain such that data about a system or process can be acquired by the digital twin and stored on the blockchain and the blockchain can trigger certain actions based on the received data according to one or more smart contracts stored on the blockchain.

The amount of real time data generated by a digital twin can vary depending upon the complexity of the system being mirrored. For example, a digital twin can be constructed that mirrors the temperature of an office. In this case, considering that the temperature of a room does not usually have sudden variations, it can be reasonable to transmit a value of temperature every minute (or every 5 minutes), in order to reduce the amount of data to be transmitted over a network. In the case of a value of temperature every minute, the digital twin will record and transmit (in real time), 60 values of temperature every hour.

Such amount of data is certainly reasonable for storage on a blockchain, and it does not create any major issues. However, the situation becomes more complicated if the system being mirrored is, for example, an engine of an aircraft during a flight, or a cylinder of a train during a train journey. In these examples, even transmitting values every second may not be sufficient, and it could be necessary to guarantee higher fidelity, e.g., a sample every millisecond (very possible in the case of an aircraft). Also, the number of variables recorded can vary and in complex systems there may be a requirement to record a large number of variable at high fidelity.

The need to consider the amount and frequency of data transmitted by a digital twin is an important premise that entails constraints when considering the blockchain as a possible backbone infrastructure for storing information related to a specific object or process.

Smart Contracts, Digital Twins and Blockchain Digital twins can be seen as external objects interacting with a blockchain, for example as an involved party in a digital contract implemented on a blockchain. That is, digital twins can be considered entities able to record transactions on the blockchain and participate in one or more digital contracts. A protocol can be provided which allows agents:

to compose financial instruments using domain specific languages (DSLs);
to outsource contract executions to untrusted parties; and
to publicly verify the correctness of the contract execution.

Such protocols make use of cryptographic primitives that ensure:

completeness (i.e., if the protocol is followed correctly then the honest verifier will be convinced of the validity of the output).

soundness (i.e., no cheating prover can convince the honest verifier that the authenticity of the output is true); and zero-knowledge (i.e., if the output is valid, no cheating verifier learns anything other than this fact).

The principal benefits of such protocols are:

man-in-the-middle attacks are prevented since no communications between the participants are requested;

it is hard for malicious nodes to tamper with the data due to the use of blockchain technologies; and contract validations do not imply code re-execution. Computations are not replicated by every node in the network. Instead, proofs of honest execution are stored in the public blockchain and used for validation purposes only.

Practical Example

The advent of the blockchain opened the possibility of new ways for automating processes involving a plurality of parties without the necessity of setting up an expensive and centralized network infrastructure and with the great advantage that all the participants have access to the same data stored in a tamper resistant record. In addition, blockchain technology enables smart contract protocols able to facilitate the negotiation and execution of a contract.

Let us consider a practical example in which three parties are involved, namely: (i) a supermarket; (ii) a delivery company; and (iii) an organic farmer. The farmer sells organic vegetables which must be consumed within 48 hours and, if sold to a supermarket (or a shop in general), the products must reach the final destination in within 8 hours, being kept refrigerated during the delivery. FIG. 2 shows the commercial chain with processes being automated among parties using the blockchain and smart contracts setting conditions for the processes.

The three parties involved in the process are independent and all involved in the value chain. This simple example shows how trust between parties is fundamental in this scenario, if no measures were considered in this process. In a simple world, the farmer knows and trusts the delivery man, being sure that the lorry used for the delivery works properly and that the temperature inside the van will be kept under 3 degrees, as requested in the contract stipulated with the supermarket. The farmer also trusts the fact that the products will be delivered in a maximum of 8 hours. At the same time, the supermarket manager knows both the farmer and the delivery man, and trusts both of them. In the case in which there is no trust, or previous history, the combination of a blockchain and a digital twin can solve the problem.

A digital twin is used in the lorry and mirrors the environmental conditions under which the organic vegetables are transported. Such information can be stored in the blockchain, and both the farmer and the supermarket manager would be able to verify what happened during the delivery. The blockchain can function as the backbone of the entire process. FIG. 3 shows a simple example of how the blockchain can be used in the process including: (i) registering data provided by the digital twin during the delivery; and (ii) recording different transactions for assuring that all conditions match the contract. The scenario can be more defined and more complex, considering the case in which all the parties involved in the process can sign all the transactions. In the proposed example, the supermarket manager does not deal with the farmer. The case proposed is very simple and the purpose is to show how the blockchain can be intertwined with digital twin technology.

In the example illustrated in FIGS. 2 and 3, the digital twin can monitor both the temperature within the lorry and also the time of delivery in order to mimic the delivery process. However, in a more simple example, if it is desired to mimic only the behaviour of temperature, then a sensor of temperature can be defined as a digital twin for such a system.

Blockchain as Storage System for Digital Twins

Figure 4:
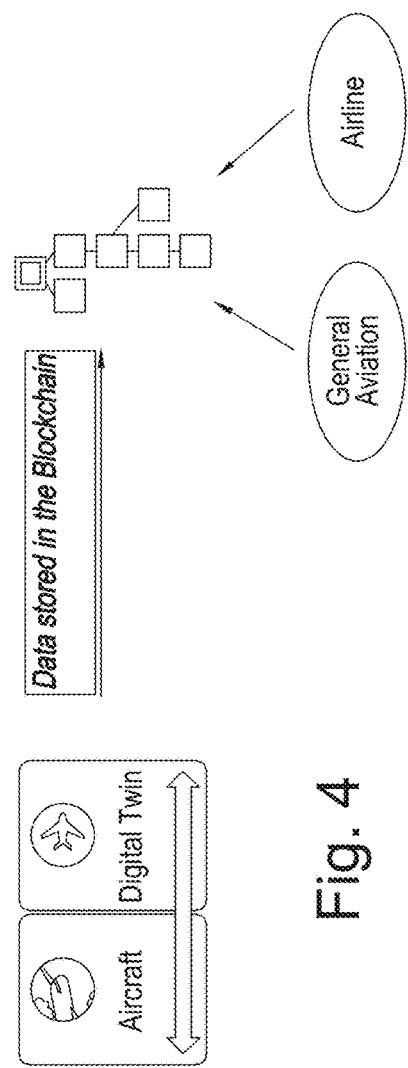
FIG. 4 shows the use of a blockchain as an independent storage system for a digital twin associated with an aircraft.

This section describes using the blockchain as a key element of a digital twin network infrastructure. The scenario in FIG. 4 shows a practical safety-critical example in which the blockchain is a fundamental component of the infrastructure. In the illustrated arrangement, a blockchain is used as an independent storage system for a digital twin associated with an aircraft.

Aircraft are highly complex systems subject to frequent maintenance activities and strict controls performed by both aviation authorities and airline companies (for civil aviation). A digital twin mirroring different subsystems of the aircraft, e.g., hydraulic pump, brake system, wings, landing gear, etc., can be extremely helpful in optimizing the maintenance process and in preventing accidents. The blockchain generates an immutable transaction history of data produced by a digital twin.

In case of near misses, or worst case scenario in case of accidents, it will be possible for both the general aviation authority and the airline company to access an immutable set of data stored on the blockchain and analyse the whole history of the flight. An array of digital twins recording the behaviour of an aircraft during a flight would constitute a powerful "flight recorder" stored in a neutral record (the blockchain) accessible by all the parties interested in checking the dataset.

Data Size and Frequency Issues

As previously described, current blockchain technology is capable of fulfilling the aforementioned functionality when relatively small amounts of data are required to be stored at relative infrequent time periods. However, block size limits, and the fact that blocks are only incorporated into the blockchain approximately every 10 minutes, means that standard blockchain technology is not well suited as a storage system for real time applications where the amount of data generated is very large and/or where there is a requirement to store the data at a high frequency/fidelity, e.g. every second or millisecond. This specification set out two approaches for overcoming the constraints imposed by the blockchain (as it is today): (i) incremental hashing of history (which may be implemented on the current bitcoin network architecture); and (ii) the use of a modified bitcoin network architecture which is adapted for handle larger quantities of data at higher rates.

Incremental Hashing of History

The idea of incremental hashing of history is strictly linked with the functioning of the blockchain. The information stored in the blockchain is not the data generated by the digital twin, but only the signed hash of a given amount of data D, generated in a given frame of time T. The time T depends on the system under analysis (e.g. if the digital twin is mirroring the temperature of a room, the frame of time will be larger than, say, if the digital twin is mirroring the function of an aircraft engine). The storage node can be a dedicated one with the warranty that the hash stored and signed in the blockchain can provide a proof of existence of the data generated by the digital twin.

Figure 5:
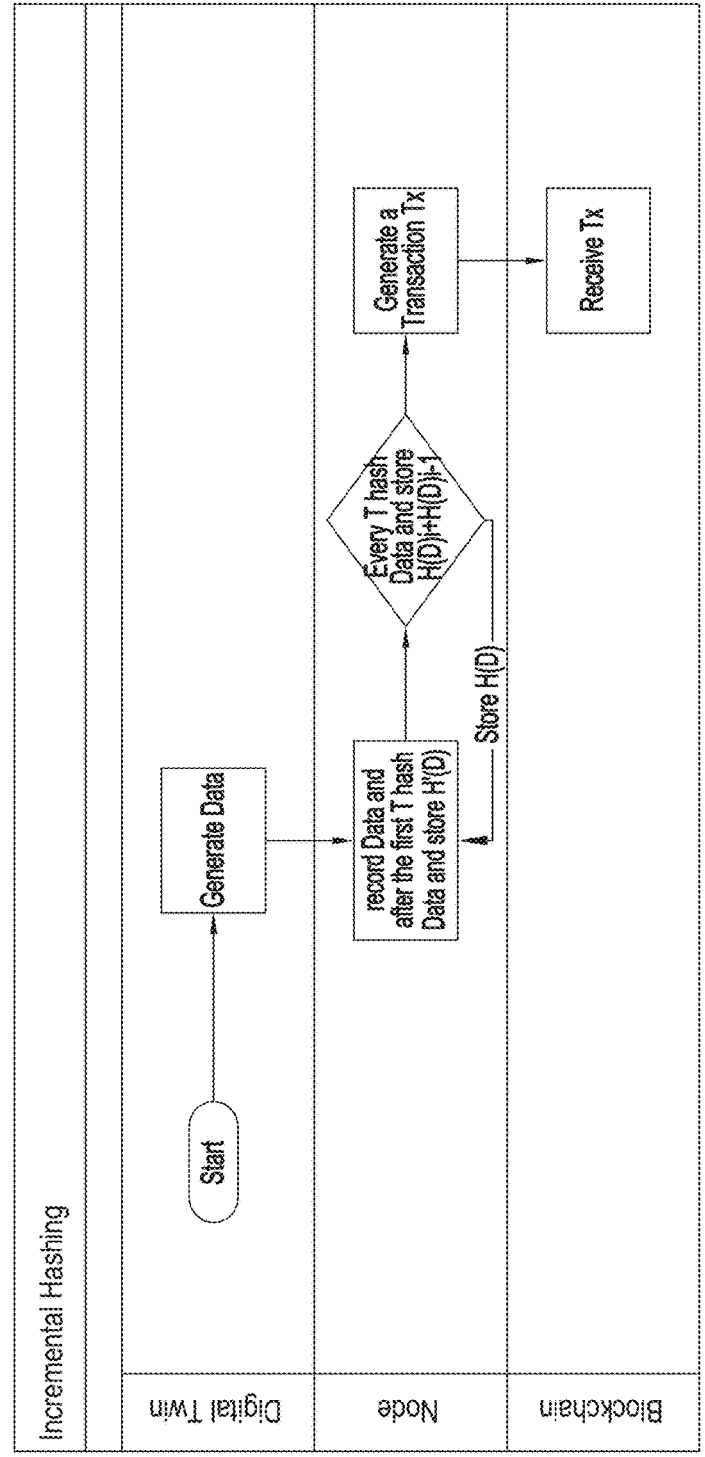
FIG. 5 illustrates an incremental hashing procedure which can be used to store a given amount of data generated by a digital twin in a given time frame.

FIG. 5 illustrates an incremental hashing procedure which can be used to store a given amount of data generated by a digital twin in a given time frame. The steps are as follows:

1. The digital twin starts recording data at a given frequency f;
2. data is recorded in a private node;
3. at time T0, the node generates the first hash (H0) hashing the data recorded by the digital twin: H0=H(D) at time T0 and records the hash both locally and in the blockchain;
4. at time T0+x, every new hash will be linked with the previous one (the second hash will be linked with H0, and so on), generating a chain of hash that will be recorded in the blockchain.

The blockchain will contain a sequence of hash through which it will be possible to rebuild the whole history of data generated by the digital twin, and it will be possible to verify the authenticity of the recorded information by the private node.

Use of a Modified Bitcoin Network Architecture

Figure 6:
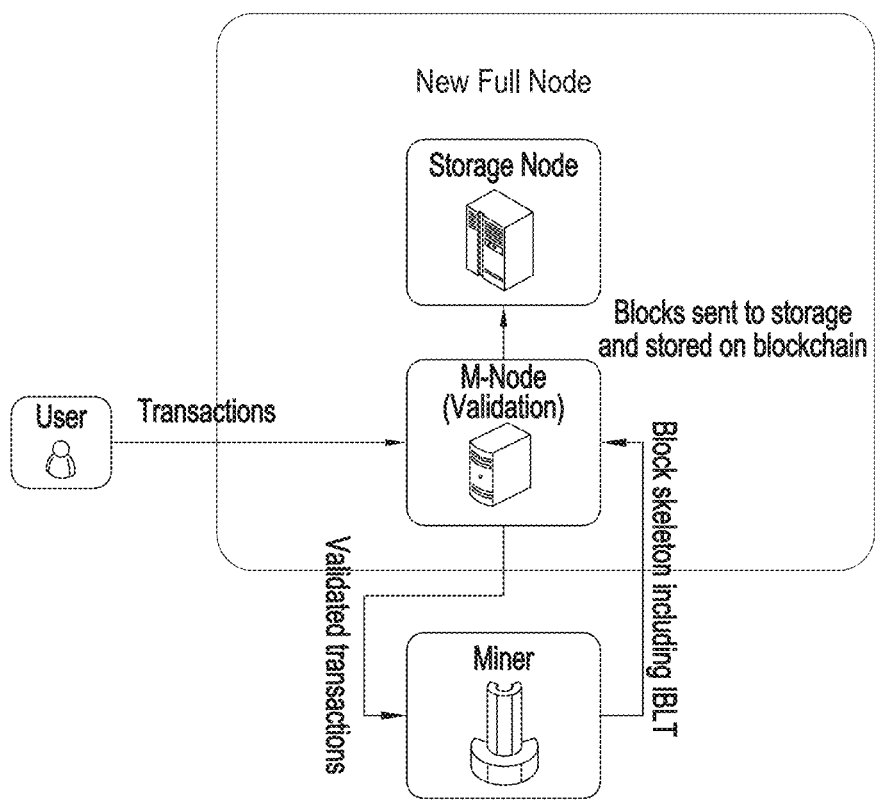
FIG. 6 illustrates a modified blockchain network architecture capable of storing large quantities of data generated by a digital twin.

The second solution uses a modified bitcoin network architecture providing specialized nodes and protocols for validation, mining, and storage functions in the bitcoin network. The architecture we propose for the Bitcoin network is illustrated in FIG. 6 which shows an operational diagram indicating the steps from the moment a user submits a transaction until it ends up on the blockchain. This architecture allows storage on the blockchain of the full history of data generated by a digital twin, even when the dataset is large and generated at high frequency/fidelity.

A system is provided where special validation nodes maintain a shared memory pool of transactions between themselves by means of a distributed hash table (DHT). These specialized validation nodes may also be referred to as merchant nodes (referred to in FIG. 6 as an "M-node"). M-nodes are designed to focus on fast propagation of transactions. They may or may not store a full blockchain and are not required to perform mining functions. The operational focus of the M-nodes is the quick validation and propagation of unconfirmed transactions, particularly to other M-nodes, from which the unconfirmed transactions are quickly pushed out to other nodes in the blockchain network. To facilitate this functionality, M-nodes are permitted a greater number of incoming and, particularly, outgoing connections that might otherwise be permitted for nodes under the governing protocol.

The specialized validation nodes receive transactions, validate them, and allocate them in the distributed memory pool (also referred to as the mempool). The validation nodes then offer their service, which is to provide a list of valid transactions hashes, to the miners. The miners assemble pre-blocks (block skeletons), based on those hashes and attempt to solve the hash puzzles. When a solution to the puzzle has been found, the winning miner sends a block skeleton back to the validation nodes. The validation nodes then validate the block and ensure it is stored. Initially, it will be possible and feasible for the validation nodes to store the blocks themselves. When the block size eventually exceeds a certain threshold in size the validation nodes will either: a) extend their own storage capability; or b) outsource storing to specialized storage nodes.

In the aforementioned network system, memory pools of transactions need to synchronize between validating nodes. This involves exchanging Invertible Bloom filter Lookup Tables (IBLTs—Michael T. Goodrich, 2011). The validation nodes keep an up-to-date mempool by means of IBLTs exchanged with miners and other validation nodes. Where the validation and storage functionality is combined this is referred to as a new full node as in FIG. 6.

The miners send a block skeleton (tuple) consisting of:
1. A nonce, n
2. IBLT
3. Coinbase transaction Based on this, the new full node orders the transactions accordingly and assembles the newly mined block. New full nodes then proceed with storing the block on their own storage, as well as propagating the skeleton to other new full nodes.

This solution overcomes the limitations of the incremental hashing of history. The main problem with the incremental hashing solution is due to the fact that the datasets generated by a digital twin would be recorded in one private node (or multiple private nodes) and the blockchain would only contain signature data associated with the history of the full dataset. This condition would be sufficient for numerous applications, e.g., selling products and supply chain management, while other applications, e.g., safety critical like flight history, would require the full set of data to be recorded in a distributed blockchain ledger.

Individual nodes in the bitcoin network can be seen as clusters of nodes providing a distributed memory pool (DMP). The proposed DMP relies on a Distributed Hash Table (DHT) structure deployed in a network composed of individual trust relations between honest nodes. A node's set of connections is built on the collection of both routing and application-level information. No central authority is involved in the release or storage of trust certifications: each node maintains records of its own trusted peers.

Malicious entities need to join the network to perform some forms of attack. For instance, Sybil attacks are focused on the creation of a high number of false identities in order to compromise the system. A Sybil node connected to the network may interrupt or delay legitimate routing queries, and disseminate erroneous routing information. However, the proposed DHT routing protocol has sublinear time and space complexity and is based on the following assumptions:

Nodes are not able to discriminate honest and malicious nodes.

The majority of honest nodes has more connections to other honest nodes.

Each node is responsible for storing information about a partition of key space.

The DHT protocol provides two main functions.

UPDATE ( ) is used to build routing tables and insert keys at each DHT node.

GET (x, k) is used by DHT node x to find the target key-value record represented by key k.

Each DHT node x is usually identified by a public key $P_x$ and the current IP address $addr_x$. This information is securely linked with a record $sign_x(P_x, addr_x)$, where $sign_x( )$ represents the signature with the corresponding private key. The node ID is then stored in the DHT using the signed record. When a node changes location or receives a new IP address, a new record $[P_x, addr_x]$ must be stored into the DHT. A malicious node could insert wrong key-value pairs. GET method is responsible to verify the signature in the returned key-value records.

The data routing network can be represented by an undirected graph. A malicious edge connects a malicious node to an honest node, while an honest edge connects two honest nodes. While creating an arbitrary number of Sybil identities may be computationally affordable for a malicious entity, creating a malicious edge requires convincing an honest node to establish a trusted link to one of the Sybil-controlled identities. If there is no sparse cut dividing the honest region in two, a short random walk starting at an honest node is likely to end at an honest node. As such, this solution provides a secure methodology for providing a bitcoin network architecture which is capable of storing large quantities of data generated by a digital twin at high fidelity in order to support the coupling of the blockchain network to a digital twin system.

Computing Environment

Figure 7:
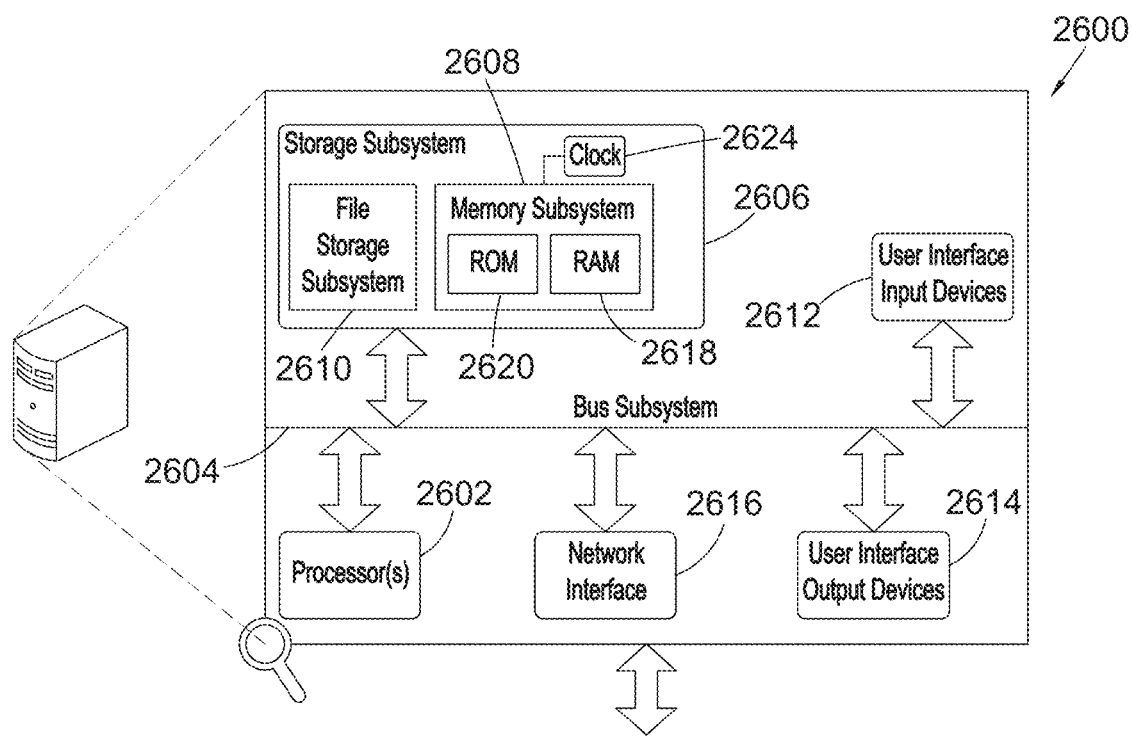
FIG. 7 is a schematic diagram illustrates a computing environment in which various embodiments can be implemented.

FIG. 7 is a schematic diagram illustrates a computing environment in which various embodiments can be implemented. There is provided an illustrative, simplified block diagram of a computing device 2600 that may be used to practice at least one embodiment of the present disclosure. In various embodiments, the computing device 2600 may be used to implement any of the systems illustrated and described above. For example, the computing device 2600 may be configured for use as a data server, a web server, a portable computing device, a personal computer, or any electronic computing device. As shown in FIG. 7, the computing device 2600 may include one or more processors with one or more levels of cache memory and a memory controller (collectively labelled 2602) that can be configured to communicate with a storage subsystem 2606 that includes main memory 2608 and persistent storage 2610. The main memory 2608 can include dynamic random-access memory (DRAM) 2618 and read-only memory (ROM) 2620 as shown. The storage subsystem 2606 and the cache memory 2602 and may be used for storage of information, such as details associated with transactions and blocks as described in the present disclosure. The processor(s) 2602 may be utilized to provide the steps or functionality of any embodiment as described in the present disclosure.

The processor(s) 2602 can also communicate with one or more user interface input devices 2612, one or more user interface output devices 2614, and a network interface subsystem 2616.

A bus subsystem 2604 may provide a mechanism for enabling the various components and subsystems of computing device 2600 to communicate with each other as intended. Although the bus subsystem 2604 is shown schematically as a single bus, alternative embodiments of the bus subsystem may utilize multiple busses.

The network interface subsystem 2616 may provide an interface to other computing devices and networks. The network interface subsystem 2616 may serve as an interface for receiving data from, and transmitting data to, other systems from the computing device 2600. For example, the network interface subsystem 2616 may enable a data technician to connect the device to a network such that the data technician may be able to transmit data to the device and receive data from the device while in a remote location, such as a data centre.

The user interface input devices 2612 may include one or more user input devices such as a keyboard; pointing devices such as an integrated mouse, trackball, touchpad, or graphics tablet; a scanner; a barcode scanner; a touch screen incorporated into the display; audio input devices such as voice recognition systems, microphones; and other types of input devices. In general, use of the term "input device" is intended to include all possible types of devices and mechanisms for inputting information to the computing device 2600.

The one or more user interface output devices 2614 may include a display subsystem, a printer, or non-visual displays such as audio output devices, etc. The display subsystem may be a cathode ray tube (CRT), a flat-panel device such as a liquid crystal display (LCD), light emitting diode (LED) display, or a projection or other display device. In general, use of the term "output device" is intended to include all possible types of devices and mechanisms for outputting information from the computing device 2600. The one or more user interface output devices 2614 may be used, for example, to present user interfaces to facilitate user interaction with applications performing processes described and variations therein, when such interaction may be appropriate.

The storage subsystem 2606 may provide a computer-readable storage medium for storing the basic programming and data constructs that may provide the functionality of at least one embodiment of the present disclosure. The applications (programs, code modules, instructions), when executed by one or more processors, may provide the functionality of one or more embodiments of the present disclosure, and may be stored in the storage subsystem 2606. These application modules or instructions may be executed by the one or more processors 2602. The storage subsystem 2606 may additionally provide a repository for storing data used in accordance with the present disclosure. For example, the main memory 2608 and cache memory 2602 can provide volatile storage for program and data. The persistent storage 2610 can provide persistent (non-volatile) storage for program and data and may include flash memory, one or more solid state drives, one or more magnetic hard disk drives, one or more floppy disk drives with associated removable media, one or more optical drives (e.g. CD-ROM or DVD or Blue-Ray) drive with associated removable media, and other like storage media. Such program and data can include programs for carrying out the steps of one or more embodiments as described in the present disclosure as well as data associated with transactions and blocks as described in the present disclosure.

The computing device 2600 may be of various types, including a portable computer device, tablet computer, a workstation, or any other device described below. Additionally, the computing device 2600 may include another device that may be connected to the computing device 2600 through one or more ports (e.g., USB, a headphone jack, Lightning connector, etc.). The device that may be connected to the computing device 2600 may include a plurality of ports configured to accept fibre-optic connectors. Accordingly, this device may be configured to convert optical signals to electrical signals that may be transmitted through the port connecting the device to the computing device 2600 for processing. Due to the ever-changing nature of computers and networks, the description of the computing device 2600 depicted in FIG. 7 is intended only as a specific example for purposes of illustrating the preferred embodiment of the device. Many other configurations having more or fewer components than the system depicted in FIG. 7 are possible.

SUMMARY

This specification describes how to use the blockchain as an independent storage system for digital twins. This specification also describes how digital smart contracts can be used to manage the interaction between the blockchain, a digital twin, and an external physical system. In the case where large amounts of data is required to be stored, two solutions are described, the first based on incremental hashing of history, in which only specific hashes are recorded in the blockchain, while in the second the use of distributed memory pool and new full nodes is provided for enabling the blockchain as a complete backbone of a digital twin infrastructure.

It should be noted that the above-mentioned embodiments illustrate rather than limit the invention, and that those skilled in the art will be capable of designing many alternative embodiments without departing from the scope of the invention as defined by the appended claims. In the claims, any reference signs placed in parentheses shall not be construed as limiting the claims. The word "comprising" and "comprises," and the like, does not exclude the presence of elements or steps other than those listed in any claim or the specification as a whole. In the present specification, "comprises" means "includes or consists of" and "comprising" means "including or consisting of." The singular reference of an element does not exclude the plural reference of such elements and vice-versa. The invention may be implemented by means of hardware comprising several distinct elements, and by means of a suitably programmed computer. In a device claim enumerating several means, several of these means may be embodied by one and the same item of hardware. The mere fact that certain measures are recited in mutually different dependent claims does not indicate that a combination of these measures cannot be used to advantage.

What is claimed is:

1. A system comprising:
   a computing device comprising:
      a processor; and
      memory that stores data and machine readable instructions, the data including a digital twin, the machine readable instructions being executed by the processor to cause the processor to execute operations to:
         receive data, by the digital twin, representing a state of a physical system;
         send, by the digital twin, the received data or data derived from the received data to a node of a blockchain network,
      wherein the node of the blockchain network executes operations causing the node of the blockchain network to:
         broadcast one or more transactions comprising the received data or the data derived from the received data to one or more other nodes of the blockchain network;
      wherein a transaction validation node of the blockchain network executes operations causing the transaction validation node to:
         receive the one or more transactions;
         validate the one or more transactions to provide one or more validated transactions;
         store the one or more validated transactions in a local mempool, the local mempool being synchronized with one or more other local mempools of one or more other transaction validation nodes of the blockchain network by using a distributed hash table;
         distribute one or more validated transaction hashes for the one or more stored validated transactions to a mining node of the blockchain network;
      wherein the mining node executes operations causing the mining node to:
         receive the one or more validated transaction hashes;
         assemble one or more pre-blocks based on the one or more validated transaction hashes;
         send the one or more pre-blocks to the transaction validation node;
      wherein the operations executed by the transaction validation node further cause the transaction validation node to:
         validate the one or more pre-blocks to provide one or more mined blocks; and
         store the one or more mined blocks on the blockchain network to provide an immutable record of the received data or the data derived from the received data from the digital twin.

2. The system according to claim 1, wherein the received data or the data derived from the received data, is data associated with one or more parameters of the physical system generated by one or more sensors monitoring the one or more parameters of the physical system.

3. The system according to claim 1, wherein the blockchain network executes a digital smart contract based on data sent to the blockchain network from the digital twin.

4. The system according to claim 1, wherein a pre-block comprises a nonce (n), and Invertible Bloom filter Lookup Table (IBLT), and a Coinbase transaction.

5. The system according to claim 1, wherein each transaction validation node maintain an up-to-date mempool by means of exchanging Invertible Bloom filter Lookup Tables with one or more miner nodes and the one or more other transaction validation nodes.

6. The system according to claim 1, wherein storing the one or more mined blocks comprises storing on a storage capability of the transaction validation node or outsourcing storing to one or more storage nodes of the blockchain network.

7. A computer-implemented method comprising:
   broadcasting, by a node of a blockchain network, to other nodes of the blockchain network one or more transactions comprising received data by a digital twin or data derived from the received data representing a state of a physical system;
   receiving, by a transaction validation node of the blockchain network, the one or more transactions;
   validating, by the transaction validation node, the one or more transactions to provide one or more validated transactions;
   storing, by the transaction validation node, the one or more validated transactions in a local mempool, the local mempool being synchronized with one or more other local mempools of one or more other transaction validation nodes of the blockchain network by using a distributed hash table;
   distributing, by the transaction validation node, one or more validated transaction hashes for the one or more stored validated transactions to a mining node of the blockchain network;
   receiving, by the mining node, the one or more validated transaction hashes;
   assembling, by the mining node, one or more pre-blocks based on the one or more validated transaction hashes;
   sending, by the mining node, the one or more pre-blocks to the transaction validation node;
   validating, by the transaction validation node, the one or more pre-blocks to provide one or more mined blocks; and
   storing, by the transaction validation node, the one or more mined blocks on the blockchain network to provide an immutable record of the received data or the data derived from the received data from the digital twin.

8. The method according to claim 7, wherein the received data or the data derived from the received data, is data associated with one or more parameters of the physical system generated by one or more sensors monitoring the one or more parameters of the physical system.

9. The method according to claim 7, wherein the blockchain network executes a digital smart contract based on data sent to the blockchain network from the digital twin.

10. The method according to claim 7, wherein a pre-block comprises a nonce (n), and Invertible Bloom filter Lookup Table (IBLT), and a Coinbase transaction.

11. The method according to claim 7, wherein each transaction validation node maintain an up-to-date mempool by means of exchanging Invertible Bloom filter Lookup Tables with one or more miner nodes and the one or more other transaction validation nodes.

12. The method according to claim 7, wherein storing the one or more mined blocks comprises storing on a storage capability of the transaction validation node or outsourcing storing to one or more storage nodes of the blockchain network.

13. A system comprising:
a computing device comprising:
a processor; and
memory that stores data and machine readable instructions, the data including a digital twin, the machine readable instructions being executed by the processor to receive data, by the digital twin, representing a state of a physical system, and
wherein the computing device causes the blockchain network to store the received data or data derived from the received data on the blockchain network as an immutable record by:
broadcasting, by a node, one or more transactions comprising the received data or the data derived from the received data to one or more other nodes;
receiving, by a transaction validation node, the one or more transactions;
validating, by the transaction validation node, the one or more transactions to provide one or more validated transactions;
storing, by the transaction validation node, the one or more validated transactions in-a local mempool, the local mempool being synchronized with one or more other local mempools of one or more other transaction validation nodes by using a distributed hash table;
distributing, by the transaction validation node, one or more validated transaction hashes for the one or more stored validated transactions to a mining node;
receiving, by the mining node, the one or more validated transaction hashes;
assembling, by the mining node, one or more pre-blocks based on the one or more validated transaction hashes;
sending, by the mining node, the one or more pre-blocks to the transaction validation node;
validating, by the transaction validation node, the one or more pre-blocks to provide one or more mined blocks; and
storing, by the transaction validation node, the one or more mined blocks on the blockchain network to provide the immutable record of the received data or the data derived from the received data from the digital twin.

14. The system according to claim 13, wherein the received data or the data derived from the received data, is data associated with one or more parameters of the physical system generated by one or more sensors monitoring the one or more parameters of the physical system.

15. The system according to claim 13, wherein the blockchain network executes a digital smart contract based on data sent to the blockchain network from the digital twin.

16. The system according to claim 13, wherein a pre-block comprises a nonce (n), and Invertible Bloom filter Lookup Table (IBLT), and a Coinbase transaction.

17. The system according to claim 13, wherein each transaction validation node maintain an up-to-date mempool by means of exchanging Invertible Bloom filter Lookup Tables with one or more miner nodes and the one or more other transaction validation nodes.

18. The system according to claim 13, wherein storing the one or more mined blocks comprises storing on a storage capability of the transaction validation node or outsourcing storing to one or more storage nodes of the blockchain network.

* * * * *